(12) United States Patent
Jensen

(10) Patent No.: US 7,397,863 B2
(45) Date of Patent: Jul. 8, 2008

(54) IMPLEMENTATION TECHNIQUE FOR LINEAR PHASE EQUALIZATION IN MULTI-MODE RF TRANSMITTERS

(75) Inventor: Henrik T. Jensen, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 826 days.

(21) Appl. No.: 10/954,911

(22) Filed: Sep. 30, 2004

(65) Prior Publication Data

US 2006/0068710 A1 Mar. 30, 2006

Related U.S. Application Data

(63) Continuation-in-part of application No. 10/954,883, filed on Sep. 30, 2004, and a continuation-in-part of application No. 10/944,552, filed on Sep. 17, 2004, and a continuation-in-part of application No. 10/944,551, filed on Sep. 17, 2004, and a continuation-in-part of application No. 10/925,485, filed on Aug. 25, 2004, which is a continuation-in-part of application No. 10/816,731, filed on Apr. 2, 2004, and a continuation-in-part of application No. 10/676,221, filed on Sep. 30, 2003, now Pat. No. 7,027,780.

(51) Int. Cl.
*H04L 25/49* (2006.01)
*H04L 7/00* (2006.01)
(52) U.S. Cl. ...................... 375/296; 375/371
(58) Field of Classification Search .................. 375/259, 375/268, 269, 271, 272, 273, 274, 278–285, 375/295–297, 300, 302, 305, 308, 309, 311, 375/312, 316, 320, 322, 323, 334, 336, 354, 375/371–376; 455/39, 42
See application file for complete search history.

(56) References Cited

U.S. PATENT DOCUMENTS

| | | | | |
|---|---|---|---|---|
| 6,693,969 B1 * | 2/2004 | Montalvo et al. | ........... | 375/259 |
| 7,123,666 B2 * | 10/2006 | Brown et al. | ................ | 375/303 |
| 7,239,846 B2 * | 7/2007 | Chiu et al. | .................... | 455/42 |
| 2005/0271161 A1 * | 12/2005 | Staszewski et al. | ........... | 375/308 |

* cited by examiner

*Primary Examiner*—Mohammad Ghayour
*Assistant Examiner*—Vineeta S Panwalkar
(74) *Attorney, Agent, or Firm*—Garlick Harrison & Markison; James A. Harrison

(57) ABSTRACT

The present invention implements an architecture that changes the sequence of digital processing so that equalization occurs prior to phase accumulation. A phase differentiator receives an envelope path phase signal to produce a differentiated phase signal to an equalizer. The transfer function of the phase differentiator is implemented so that it cancels, except for a one-cycle delay, the transfer function of the phase accumulator. This cancellation substantially eliminates accumulation of the envelop path phase signal. Additionally, a dither signal added to the quantization nodes in the equalizers shifts the spectral content of the quantization noise such that the phase accumulator sees the quantization noise as zero mean white noise. Implemented as one of a rounding or flooring quantizer, biquad filters in the equalizers round or truncate the equalizer output to a minimal bit width based on a desired output phase error.

11 Claims, 11 Drawing Sheets

IMPLEMENTATION TECHNIQUE FOR LINEAR PHASE EQUALIZATION IN MULTI-MODE RF TRANSMITTERS

CROSS REFERENCE TO RELATED PATENTS

The present U.S. Utility Patent Application claims priority pursuant to 35 U.S.C. § 120, as a continuation-in-part (CIP), to the following U.S. Utility Patent Applications which are hereby incorporated herein by reference in their entirety and made part of the present U.S. Utility Patent Application for all purposes:
1. U.S. patent application Ser. No. 10/676,221, entitled "A Technique for Improving Modulation Performance of Translational Loop RF Transmitters," filed Sep. 30, 2003 (now U.S. Pat. No. 7,027,780 issued Apr. 11, 2006);
2. U.S. patent application Ser. No. 10/925,485, entitled "A Digital Delay Element for Delay Mismatch Cancellation in Wireless Polar Transmitters" filed Aug. 25, 2004, pending;
3. U.S. patent application Ser. No. 10/954,883, entitled "Architectural Techniques for Envelope and Phase Signal Alignment in RF Polar Transmitters Using Power Amplifier Feedback" filed Sep. 30, 2004, pending;
4. U.S. patent application Ser. No. 10/944,55 1, entitled "Digital Algorithm for On-Line ACPR Optimization in Polar RF Transmitters" filed Sep. 17, 2004, pending; and
5. U.S. patent application Ser. No. 10/944,552, entitled "Digital Modulator for a GSM/GPRS/EDGE Wireless Polar RF Transmitter" filed Sep. 17, 2004, pending.

BACKGROUND

1. Technical Field

The present invention relates to wireless communications and, more particularly, wideband wireless communication systems.

2. Related Art

Modern wireless radio frequency (RF) transmitters for applications, such as cellular, personal, and satellite communications, employ digital modulation schemes such as Frequency Shift Keying (FSK) and Phase Shift Keying (PSK), and variants thereof, often in combination with Code Division Multiple Access (CDMA) communication. Independent of the particular communications scheme employed, the RF transmitter output signal, sRF(t), can be represented mathematically as $$s_{RF}(t) = r(t)\cos(2\pi f_c t + \theta(t)) \quad (1)$$

where $f_c$ denotes the RF carrier frequency, and the signal components $r(t)$ and $\theta(t)$ are referred to as the envelope and phase of $s_{RF}(t)$, respectively.

Some of the above mentioned communication schemes have constant envelope, i,e., $$r(t) = R,$$

and these are thus referred to as constant envelope communications schemes. In these communications schemes, $\theta(t)$ constitutes all of the information bearing part of the transmitted signal. Other communications schemes have envelopes that vary with time and these are thus referred to as variable envelope communications schemes. In these communications schemes, both $r(t)$ and $\theta(t)$ constitute information bearing parts of the transmitted signal.

The most widespread standard in cellular wireless communications is currently the Global System for Mobile Communications (GSM). A second generation standard employs Gaussian Minimum Shift Keying (GMSK), which is a constant envelope binary modulation scheme allowing raw transmission at a maximum rate of 270.83 kilobits per second (Kbps). In any mobile communication system the radio spectrum is a very limited resource shared by all users. GSM employs a combination of Time Division Multiple Access (TDMA) and Frequency Division Multiple Access (FDMA) for the purpose of sharing the spectrum resource. GSM networks typically operate in the 900 MHz frequency range. The radio spectrum in the bands 890-915 MHz is for the uplink (mobile station to base station) and 935-960 MHz is for the downlink (base station to mobile station). The spectrum for both uplink and downlink is divided into 200 kHz wide carrier frequencies using FDMA, and each base station is assigned one or more carrier frequencies. Each carrier is divided into eight time slots using TDMA. Eight consecutive time slots form one TDMA frame, with a duration of 4.615 ms. A physical channel occupies one time slot within a TDMA frame. Each time slot within a frame is also referred to as a burst. TDMA frames of a particular carrier frequency are numbered, and formed in groups of 26 or 51 TDMA frames called multi-frames. While GSM is sufficient for standard voice services, future high-fidelity audio and data services demand higher data throughput rates.

General Packet Radio Service (GPRS) is a new non-voice service that allows information to be sent and received across a mobile telephone network. It supplements today's Circuit Switched Data (CSD) and Short Message Service (SMS). GPRS employs the same modulation scheme as GSM, but higher data throughput rates are achievable with GPRS since it allows for all eight time slots to be used by a mobile station at the same time.

Even higher data rates are achieved in the specification of the Enhanced Data rates for GSM Evolution (EDGE) cellular telephony standard by selectively applying a $3\pi/8$ offset, 8-level PSK (8-PSK) modulation scheme. With this variable envelope communication scheme, the maximum bit rate is tripled compared to GSM, while the chosen pulse shaping ensures that the RF carrier bandwidth is the same as that of GSM, allowing for the reuse of the GSM frequency bands. Additionally, to further increase the flexibility of data transmission, so-called multi-slot operation has been introduced into GSM/GPRS/EDGE systems. In multi-slot operation, more than one time slot out of the eight in one GSM frame can be used for transmission with GMSK and/or 8-PSK modulation.

As mentioned above, the GMSK modulation scheme of standard GSM is an example of a constant envelope communications scheme. An example transmitter appropriate for such constant envelope modulation schemes in a mobile station unit is a translational loop transmitter. In this transmitter, the digital baseband data enters a digital processor that performs the necessary pulse shaping and modulation to some intermediate frequency (IF) carrier $f_{IF}$. The resulting digital signal is converted to analog using a digital-to-analog converter (DAC) and a low pass filter (LPF) that filters out undesired digital images of the IF signal. A translational loop, essentially a phase locked loop (PLL), then translates, or up-converts, the IF signal to the desired RF frequency and a power amplifier (PA) delivers the appropriate transmit power to the antenna.

As mentioned above, the 8-PSK modulation scheme of EDGE is an example of a variable envelope communications scheme. In practice, the power spectrum emitted from an EDGE transmitter will not be ideal due to various imperfections in the RF transmitter circuitry. Thus, quality measures of the transmitter performance have been established as part of the EDGE standard and minimum requirements have been set. One quality measure that relates to the RF signal power spectrum is the so-called spectral mask. This mask represents the maximum allowable levels of the power spectrum as a function of frequency offset from the RF carrier in order for a given transmitter to qualify for EDGE certification. In other words, the spectral mask requirements limit the amount of transmitter signal leakage into other users' signal spectrum. For example, at a frequency offset of 400 kHz (0.4 MHz), the maximum allowable emission level is −54 dB relative to the carrier (dBc). Another RF transmitter quality measure of the EDGE standard is the modulation accuracy, which relates the RF transmitter modulation performance to an ideal reference signal. Modulation accuracy is related to the so-called Error Vector Magnitude (EVM), which is the magnitude of the difference between the actual transmitter output and the ideal reference signal. The error vector is, in general, a complex quantity and hence can be viewed as a vector in the complex plane. Modulation accuracy is stated in root-mean-square (RMS), 95th percentile, and peak values of the EVM and is specified as a percentage. For a given transmitter to qualify for EDGE certification, the RMS EVM must be less than 9%, the 95th percentile of EVM values must be less than 15%, and the peak EVM value must be less than 30%.

The increase in system flexibility resulting from the introduction of multi-slot operation in EDGE presents the challenge of finding an efficient implementation of a joint GMSK/8-PSK modulator which enables easy and fast switching between GMSK and 8-PSK modulation in consecutive time slots. Such modulation switching must be achieved within the so-called guard interval, merely 30 microseconds (µs) long. Further complication is encountered in the domain of the RF frequency PA. Exploiting the fact that GMSK is a constant envelope modulation scheme, the PA can typically be driven in saturation mode for higher efficiency when transmitting GSM signals. However, due to the variable envelope properties of the 8-PSK modulation option in EDGE, driving the PA in saturated mode is not possible. Rather, a certain power back-off of the PA input signal level is required to maintain adequate modulation accuracy. Typical transmitter powers may be 33 dBm in GMSK mode and 27 dBm in PSK mode. Thus, when switching modulation schemes in multi-slot operation from GMSK to 8-PSK, or vice versa, a change of PA input signal level must occur. Such change must be achieved within the guard interval and in such a fashion that switching transients do not violate the spectral mask requirements.

Another potential cause of performance degradation of RF polar transmitters is the so-called reference feed-through caused by several phase-locked loop component non-idealities, such as non-zero reset delay of the phase frequency detector (PFD) as well as mismatches between the "up" and "down" current sources of the charge pump. Reference feed-through generates tones at the RF output offset by an amount equal to the reference frequency and may lead to violation of the spurious emissions requirements of the EDGE standard. Reference feed-through may be controlled by design of the PLL signal filter. It is desirable that the PLL signal filter transfer function, H(s), equals one for all frequencies. In this case, the PLL signal filter imposes no distortion on the signal and therefore does not introduce modulation error.

In practice, designing the PLL such that H(s)=1, i.e., has infinite bandwidth, is impossible. Firstly, it can be shown that loop stability considerations dictate that the bandwidth of the PLL signal filter be less than about 1/10 of the IF frequency. Thus, for example, for a translational loop with an IF frequency of 26 MHz, H(s) must thus have bandwidth less than 2.6 MHz. Secondly, narrowing the PLL signal filter bandwidth reduces the amount of "feed-through" of the IF reference signal to the RF output signal and is thus a desirable design option. Reference feed-through is the result of several PLL component non-idealities such as non-zero reset delay of the PFD, as well as mismatches between the "up" and "down" current sources of the charge pump. These non-ideal effects create a periodic signal on the voltage controlled oscillator (VCO) control voltage corresponding to the reference frequency and are thus translated to the RF signal as spurious emission. Typically, in a high-speed digital CMOS process, the reset delay of the PFD is a few nanoseconds, and the mismatch of the charge pump current sources 5-10%.

In the prior art, the maximum narrowness of H(s) is mainly dictated by the bandwidth of the signal and the permissible modulation error. For example, in GSM, where the RMS transmitter phase modulation error performance must be better than 5° and the peak modulation error must be better than 20°, designing the PLL filter narrower than 1 MHz leads to prohibitively large modulation errors. In this case, the attenuation of reference feed-through by the PLL filter is limited and, for practical PFD reset delays and CP current source mismatches in a CMOS process, may not suffice to meet the spurious emissions requirements of the GSM standard as stated in the example.

Modulation error as a result of a narrow PLL signal filter is due to both amplitude distortion as well as group delay variation over the signal band of interest. Stated differently, group delay variation causes different frequency components of the transmitter signal to travel through the transmitter at different speeds, thereby causing inter-symbol interference. As an example, for a prior art translational loop, the modulation error resulting from the PLL signal filter is approximately 0.53° RMS. While this amount of modulation error is less than the GSM standard permits, it is typically the maximum that can be allowed in the absence of other non-ideal effects, such as analog circuit noise and non-linearities, component variations due to process variations, and component value fluctuations due to temperature variations. All of these effects add up to form the total modulation error.

Thus, in order to meet spurious emissions requirements, the translational loop RF transmitter PLL signal filter is made sufficiently narrow that worst-case reference feed-through is attenuated below the −112 dBc specification. To enable this approach, digital signal processing is employed in the baseband processor to eliminate the modulation error problems otherwise caused by a narrow PLL signal filter. Specifically, the transmit signal generated by the baseband processor is "pre-distorted" so as to counter act the distortion imposed by a narrow PLL signal filter. This "pre-distortion", or equalization process, typically occurs in two steps: a magnitude equalizer filter pre-distorts the amplitude of the transmit signal according to the inverse of the PLL signal filter magnitude response, and a group delay equalizer filter linearizes the phase response of the entire transmitter chain, i.e., pre-distorts the transmit signal such that the combined phase response of magnitude equalizer, group delay equalizer, and PLL signal filter is linear.

However, a problem exists when the phase accumulator output increases without bound due to the quantization noise present in the equalizers. This accumulation of quantization noise gives rise to unacceptably large modulation errors. Therefore, it is clear that a need exists for a modulator that can switch between modulation modes while adhering to modulation error requirements in RF polar transmitters that are presently being designed.

SUMMARY OF THE INVENTION

The apparatus and method of the present invention substantially solves these problems by implementing an architecture that employs a new digital processing sequence. Among other aspects of the inventive architecture, equalizers perform equalization prior to phase accumulation within phase accumulators. A phase differentiator receives an envelope path phase signal to produce a differentiated phase signal to the equalizer. The transfer function of the phase differentiator is implemented so that it cancels, except for a one cycle delay, the transfer function of the phase accumulator. This cancellation substantially eliminates accumulation of the envelope path phase signal. Additionally, a dither signal added to the quantization nodes in the equalizers to shift the spectral content of the quantization noise to an out of band frequency range such that the accumulator sees the quantization noise as zero mean white noise.

Implemented as one of a rounding or flooring quantizer, biquad filters in the equalizers round or truncate the equalizer output to a minimal bit width based on a desired output phase error. The method of the present invention includes determining and setting a minimal bit width of the equalizers that satisfy the desired output phase error.

The above-referenced description of the summary of the invention captures some, but not all, of the various aspects of the present invention. The claims are directed to some of the various other embodiments of the subject matter towards which the present invention is directed. In addition, other aspects, advantages, and novel features of the invention will become apparent from the following detailed description of the invention when considered in conjunction with the accompanying drawings.

DETAILED DESCRIPTION OF THE DRAWINGS

Figure 1:
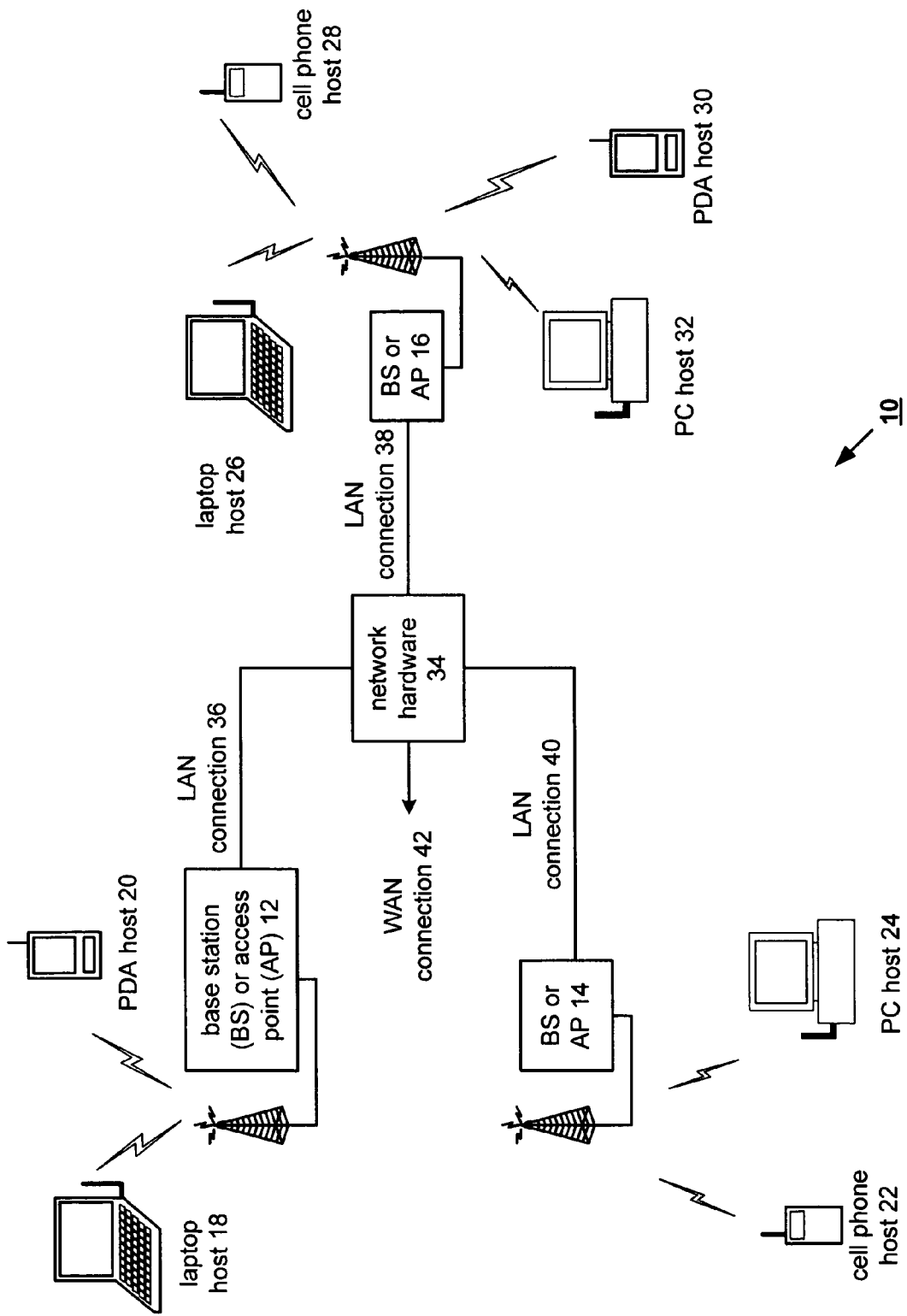
FIG. 1 is a functional block diagram illustrating a communication system that includes a plurality of base stations or access points, a plurality of wireless communication devices, and a network hardware component.

A better understanding of the present invention can be obtained when the following detailed description of the preferred embodiment is considered with the following drawings, in which:

FIG. 1 is a functional block diagram illustrating a communication system 10 that includes a plurality of base stations or access points (APs) 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32, and/or cellular telephone hosts 22 and 28. The details of the wireless communication devices will be described in greater detail with reference to FIG. 2.

The base stations or access points 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. Any of the hosts may include a digital modulator operable in one of a GSM, General Packet Radio Service (GPRS), and EDGE modulation modes. When operating a multi-mode modulator that switches between modulation modes, GMSK and 8-PSK for example, the present invention substantially limits the accumulation of quantization noise that would otherwise contribute to modulation errors.

Figure 2:
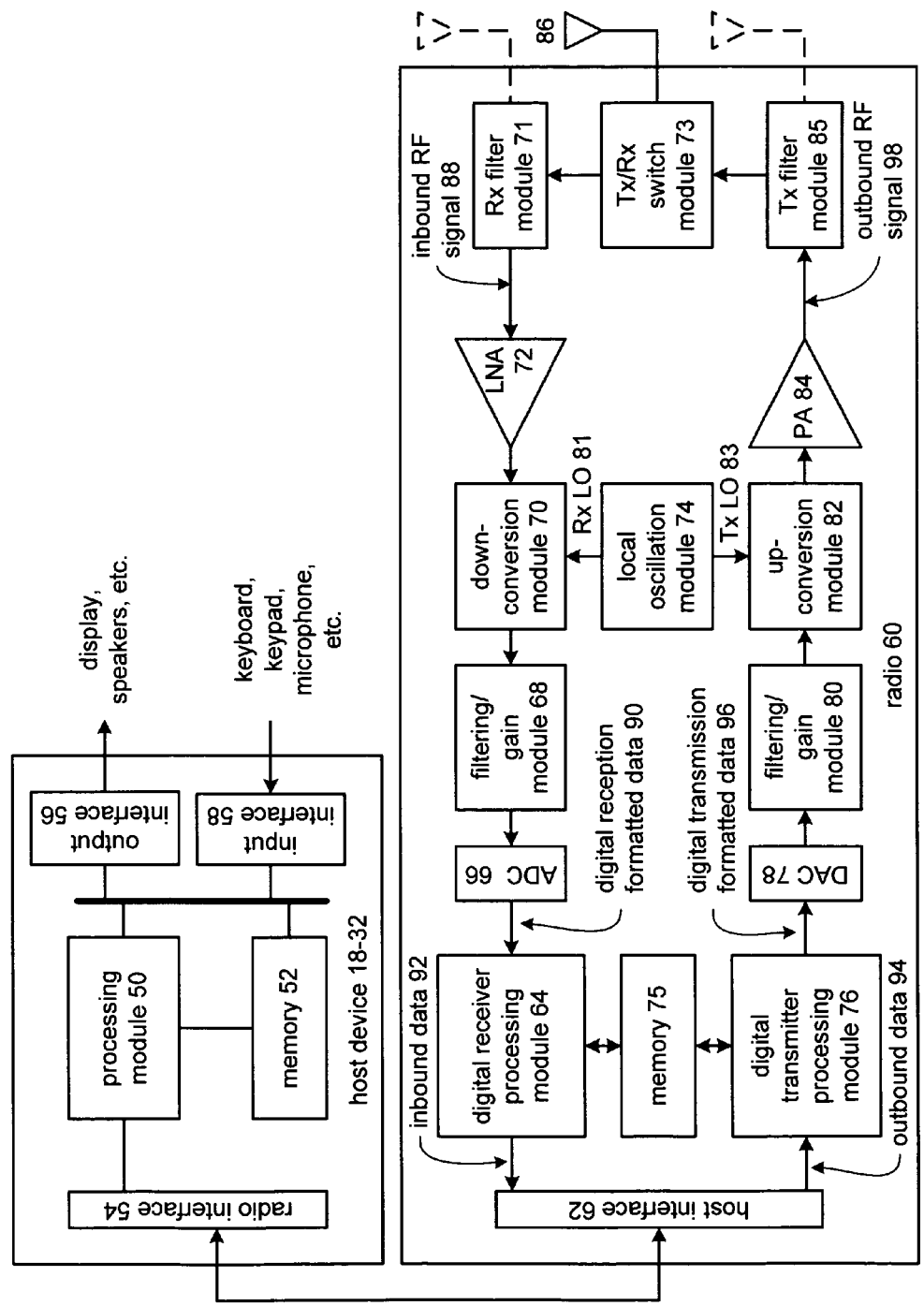
FIG. 2 is a schematic block diagram illustrating a wireless communication device as a host device and an associated radio.

FIG. 2 is a schematic block diagram illustrating a wireless communication device 18-32 as a host device and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host wireless communication device 18-32 includes a processing module 50, a memory 52, a radio interface 54, an input interface 58 and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output device, such as a display, monitor, speakers, etc., such that the received data may be displayed. The radio interface 54 also provides data from the processing module 50 to the radio 60. The processing module 50 may receive the outbound data from an input device, such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (TX/RX) switch module 73, a local oscillation module 74, a memory 75, a digital transmitter processing module 76, a digital-to-analog converter 78, a filtering/gain module 80, an intermediate frequency (IF) mixing up-conversion module 82, a power amplifier (PA) 84, a transmitter filter module 85, and an antenna 86. The antenna 86 is shared by the transmit and receive paths as regulated by the TX/RX switch module 73. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and/or modulation. The digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the digital receiver processing module 64 and/or the digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and the digital receiver processing module 64 and/or the digital transmitter processing module 76 executes, operational instructions corresponding to at least some of the functions illustrated herein.

In operation, the radio 60 receives outbound data 94 from the host wireless communication device 18-32 via the host interface 62. The host interface 62 routes the outbound data 94 to the digital transmitter processing module 76, which processes the outbound data 94 in accordance with a particular wireless communication standard (e.g., GSM, EDGE, IEEE 802.11a, IEEE 802.11b, Bluetooth, etc.) to produce digital transmission formatted data 96. The digital transmission formatted data 96 produced by a digital modulator of the present invention will be a digital baseband signal or a digital low IF signal, where the low IF typically will be in the frequency range of 100 KHz to a few megahertz.

The digital-to-analog converter 78 converts the digital transmission formatted data 96 from the digital domain to the analog domain. The filtering/gain module 80 filters and/or adjusts the gain of the analog baseband signal prior to providing it to the up-conversion module 82. The up-conversion module 82 directly converts the analog baseband signal, or low IF signal, into an RF signal based on a transmitter local oscillation 83 provided by local oscillation module 74. Local oscillation module 74 is, in one embodiment of the invention, a multi-stage mixer as described herein. The power amplifier 84 amplifies the RF signal to produce an outbound RF signal 98, which is filtered by the transmitter filter module 85. The antenna 86 transmits the outbound RF signal 98 to a targeted device, such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the TX/RX switch module 73, where the RX filter module 71 band pass filters the inbound RF signal 88. The RX filter module 71 provides the filtered RF signal to low noise amplifier 72, which amplifies the inbound RF signal 88 to produce an amplified inbound RF signal. The low noise amplifier 72 provides the amplified inbound RF signal to the down-conversion module 70, which directly converts the amplified inbound RF signal into an inbound low IF signal or baseband signal based on a receiver local oscillation signal 81 provided by local oscillation module 74. Local oscillation module 74 is, in one embodiment of the invention, a multi-stage mixer as described herein. The down-conversion module 70 provides the inbound low IF signal or baseband signal to the filtering/gain module 68. The filtering/gain module 68 may be implemented in accordance with the teachings of the present invention to filter and/or attenuate the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host wireless communication device 18-32 via the radio interface 54.

As one of average skill in the art will appreciate, the wireless communication device of FIG. 2 may be implemented using one or more integrated circuits. For example, the host device may be implemented on a first integrated circuit, while the digital receiver processing module 64, the digital transmitter processing module 76 and memory 75 are implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of host device 18-32 and the digital receiver processing module 64 and the digital transmitter processing module 76 of radio 60 may be a common processing device implemented on a single integrated circuit. Further, memory 52 and memory 75 may be implemented on a single integrated circuit and/or on the same integrated circuit as the common processing modules of processing module 50, the digital receiver processing module 64, and the digital transmitter processing module 76.

Figure 3:
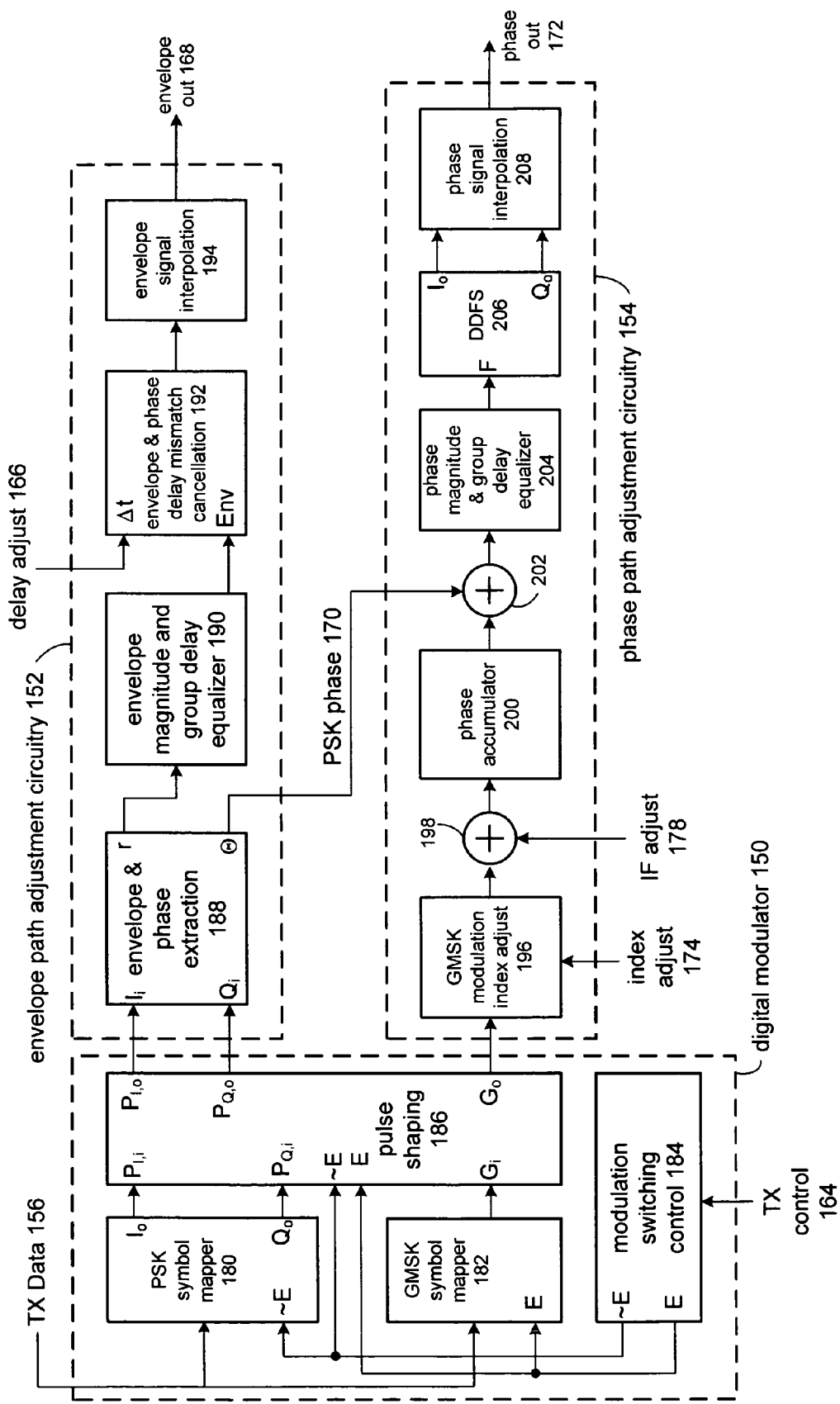
FIG. 3 is a schematic block diagram of digital modulator circuitry that allows for switching between modulation schemes while adhering to spectral mask requirements.

FIG. 3 is a schematic block diagram of digital modulator circuitry that allows for switching between modulation schemes while adhering to spectral mask requirements. The digital modulator circuitry consists of a plurality of processing blocks, namely digital modulator 150, envelope path adjustment circuitry 152, and phase path adjustment circuitry 154, to produce a digital modulator suitable for a GSM, a GPRS, or an EDGE wireless RF polar transmitter. The digital modulator circuitry is generally applicable to any RF polar transmitter intended to support continuous switching between PSK and GMSK modes although the described embodiment is directed to the EDGE standard.

As shown in FIG. 3, digital modulator 150 receives TX data 156 and modulator control signal, TX control 164. The TX data 156 consists of either single-bit data for GMSK modulation, or three-bit data for 8-PSK modulation. The TX data bits are mapped to transmitter symbols by a PSK symbol mapper 180 and a GMSK symbol mapper 182. Modulation switching control 184 enables one of PSK symbol mapper 180 or GMSK symbol mapper 182 based on a setting of TX control 164. The symbols produced by PSK symbol mapper 180 and the GMSK symbol mapper 182 are operably coupled to pulse shaping block 186 where the symbols are pulsed shaped by a plurality of transmit filters. The process of pulse shaping ensures that the transmitted RF signal is sufficiently band limited so as to not interfere excessively with adjacent RF channels. Specifically, pulse shaping block 186 implements Infinite Impulse Response (IIR) filters for the pulse shaping, consisting of a Gaussian filter with a BT product of 0.3 for the GMSK transmit mode, where the term "BT" denotes the product of filter bandwidth (B) and the symbol time (T). A similar filter is employed for the PSK mode. The BT product represents a degree of filtering and is derived from the product of the filter 3 dB bandwidth and the bit period of the transmission. The PSK filtered symbols produced by pulse shaping block 186 are complex, consisting of in-phase (I) and quadrature (Q) components.

Envelope and phase extraction 188 extracts the envelope and phase of the PSK signal and splits the processing paths of the two signal components. An envelope signal is subsequently processed by an envelope magnitude and group delay equalizer 190 that pre-distorts the envelope magnitude and group delay response to counter-act non-ideal processing by the analog components of the transmitter. Envelope magnitude and group delay equalizer 190 and a phase accumulator 200 provide digital pre-distortion of the envelope signal and phase signal, respectively. The transmitter contains analog components that impose a certain amount of distortion on the transmitted signal. Such distortion can largely be categorized as magnitude variation and group delay variation. If left uncompensated, such distortion typically leads to degraded modulator performance in the form of unacceptable modulation errors including spectral mask requirement violations. The equalizers of FIG. 3 are digital filters and can be either Finite Impulse Response (FIR) or Infinite Impulse Response (IIR), or a combination thereof, according to design preference, and may be divided into two separate sections; one section that pre-distorts the magnitude response and one section that pre-distorts the group delay response.

Envelope and phase delay mismatch cancellation 192 imposes a programmable delay on the envelope signal specified by the parameter delay adjust 166. The sampling rate of the envelope signal is then increased to an appropriate value by envelope signal interpolation 194, which also performs appropriate signal quantization to remove most of the quantization noise. The sampling rate of the envelope signal is increased to an appropriate or desired value according to design requirements by envelope signal interpolation 194. Envelope signal interpolation 194 also performs signal quantization.

The pulse shaped Gaussian signal, Go, produced by pulse shaping 196 is typically produced with a modulation index that is nominally set to 0.5. The signal Go, however, can be fine adjusted by GMSK modulation index adjust 196 based on index adjust 174. The resulting signal is operably coupled to a summing junction 198 where it is summed with an IF adjust signal 178 to fine adjust the IF frequency, if necessary.

The output of summing junction 198 is then produced to phase accumulator 200. Phase accumulator 200 adds the incoming phase signal with a previous (in time) phase signal delayed by one bit period. The resulting summed phase signal is combined with the phase component of the PSK signal, namely, PSK phase signal 170. As previously discussed, adding the PSK phase signal 170 provides a smooth transition during the transition from PSK to GMSK modulation modes. Phase magnitude and group delay equalizer 204 pre-distorts the signal from a summing junction 202 to counter-act distortion imposed by subsequent processing by the analog transmitter components. The pre-distorted signal is up-converted by Direct Digital Frequency Synthesizer (DDFS) 206 then the sampling rate of the modulated complex signal is increased to an appropriate value by phase signal interpolation 208, which also performs appropriate signal quantization. Phase signal interpolation 208 is appropriate for the EDGE RF polar transmitter architecture. The 3.25 MHz $I_o$ and $Q_o$ input signals are up-converted by a 32× up-converter to 104 MHz then low pass filtered and mixed with a local oscillation to extract the signal information from the in-phase and quadrature signals $I_o$ and $Q_o$, respectively. The resultant signals are summed to produce phase output signal 172.

Envelope and phase extraction 188 converts the PSK in-phase and quadrature components produced by pulse shaping block 186 to a phase component, θ, and a magnitude component, "r". The phase component, PSK phase signal 170, is operably coupled to summing junction 202 in the phase path, while the magnitude component is operably coupled to envelope magnitude and group delay equalizer 190. The equalized signal is operably coupled to envelope and phase delay mismatch cancellation 192. Envelope and phase delay mismatch cancellation 192 consists of digital circuitry that implements a programmable delay of the envelope signal, as specified by the parameter delay adjust 166. This allows for fine adjustment of the envelope signal delay and hence delay mismatch cancellation between envelope and phase signal paths. Envelope signal interpolation 194 produces an envelope out 168 from the envelope and phase adjusted signal. The sampling rate of the envelope signal is increased to an appropriate value by envelope signal interpolation 194, which also performs appropriate signal quantization. Problematic aspects of the digital modulator circuitry of FIG. 3 in a practical implementation is the GMSK phase accumulator and the addition of the PSK phase signal after the phase accumulator prior to the phase magnitude and group delay equalization. The problems arise in that the input to the phase magnitude and group delay equalization cannot be allowed to "wrap-around" such as may be encountered in two's complement arithmetic. The bit length of the accumulator nodes could be made larger to avoid phase "wrap-around", but this is impractical for very long continuous-mode transmissions where the absolute value of the phase may approach very large values.

Figure 4:
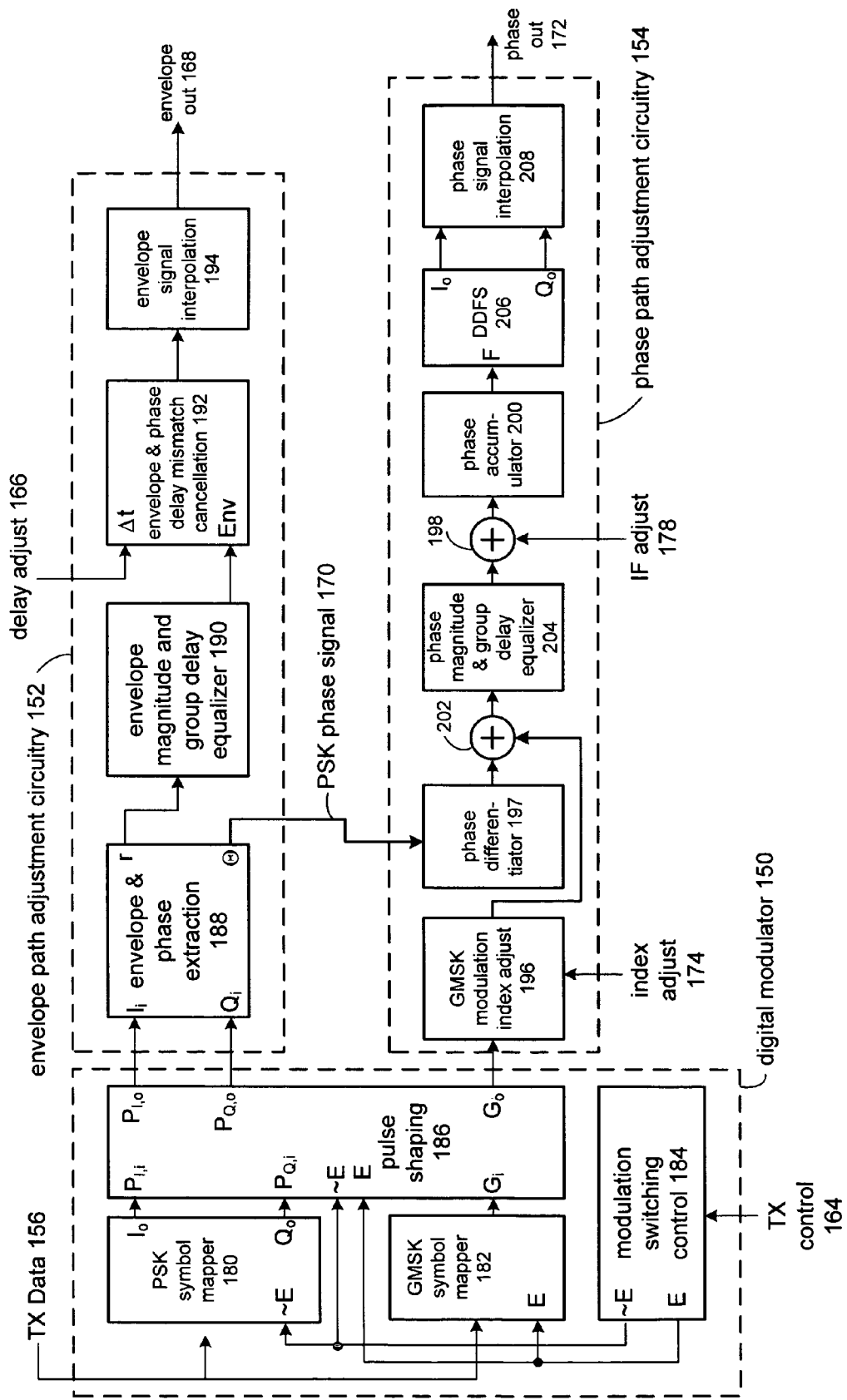
FIG. 4 is a schematic block diagram of a digital modulator in accordance with an embodiment of the present invention.

FIG. 4 is a schematic block diagram of a digital modulator in accordance with an embodiment of the present invention. The architecture of FIG. 4 allows for a hardware efficient implementation of the IIR equalizers, as well as for a precisely predictable equalizer performance. In the present embodiment, the phase magnitude and group delay equalization occurs prior to phase accumulation, and the phase accumulator may now be implemented with "wrap-around" two's complement arithmetic since its output, F, is processed by DDFS 206. As an undesired side effect, PSK phase signal 170 is also accumulated, so a phase differentiator 197 has been inserted to neutralize the processing of phase accumulator 200.

Figure 5:
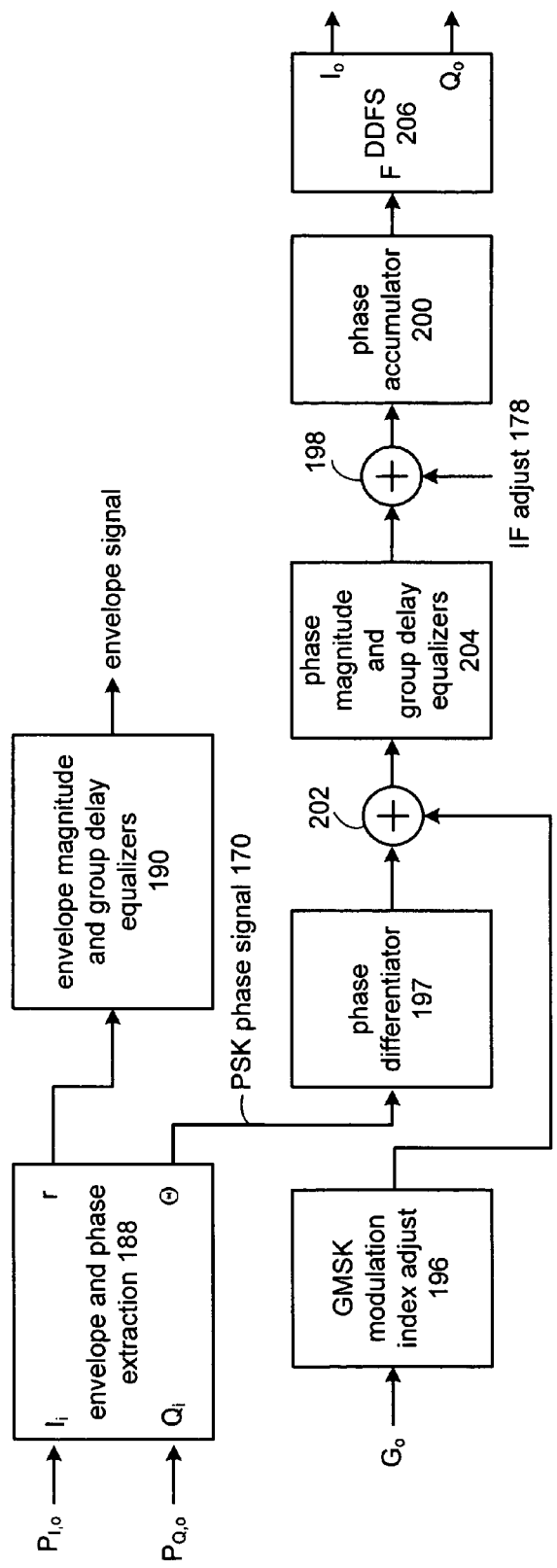
FIG. 5 is a schematic block diagram of the phase adjustment section of FIG. 4.
Figure 7:
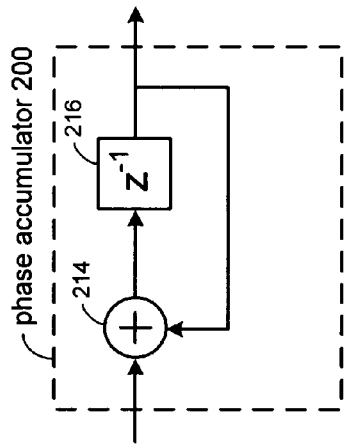
FIG. 7 is a schematic block diagram of a phase accumulator of the present invention.
Figure 6:
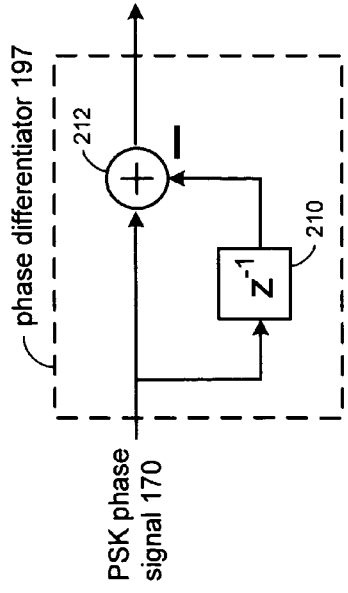
FIG. 6 is a schematic block diagram of a phase differentiator of the present invention.

FIG. 5 is a schematic block diagram of the phase adjustment section of FIG. 4. The signal transfer function of phase differentiator 197 shown in FIG. 6 is $$H_{DIFF}(z)=1-z^{-1}$$

and the signal transfer function of phase accumulator 200 shown in FIG. 7 is $$H_{INT}(z) = \frac{z^{-1}}{1-z^{-1}}$$

It follows that $$H_{DIFF}(z) \times H_{INT}(z) = z^{-1}$$

and hence, aside from a single signal delay, the phase accumulation processing in the PSK signal path is neutralized to avoid uncontrolled accumulation of quantization noise.

FIG. 6 is a schematic block diagram of a phase differentiator of the present invention. Phase differentiator 197 includes a delay element 210 and a summing node 212. PSK phase signal 170 is operably coupled to an input of delay element 210 and to an input of summing node 212 that subtracts a one cycle delayed sample of PSK phase signal 170 from the output signal to neutralize the processing of the phase accumulator. The phase accumulator has a transfer function of $$H_{DIFF}(z)=1-z^{-1}.$$

FIG. 7 is a schematic block diagram of a phase accumulator of the present invention. Phase accumulator 200 includes a summing node 214 and a delay element 216. Summing node 214 adds a one cycle delayed output signal with the input signal to produce a linearly increasing or accumulated phase signal. The transfer function of phase accumulator 200 is $$H_{INT}(z) = \frac{z^{-1}}{1-z^{-1}}.$$

Figure 8:
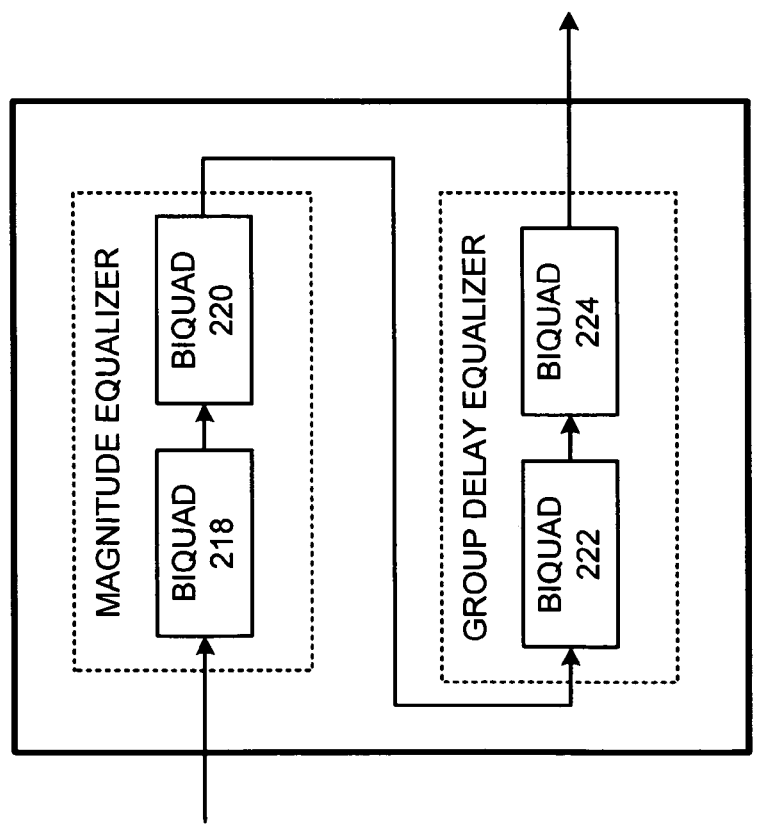
FIG. 8 is a functional block diagram of a magnitude and group delay equalizer of the present invention.

FIG. 8 is a functional block diagram of the magnitude and group delay equalizer of the present invention. The equalizer is implemented as a magnitude equalizer followed by a group delay equalizer. The magnitude equalizer includes a cascade of second order IIR filters, or biquads, namely biquad 218 and 220, while the group delay equalizer includes a cascade of biquads, namely biquad 222 and biquad 224. Each equalizer is implemented as a fourth order infinite impulse response (IIR) filter (a digital filter). The magnitude equalizer has a transfer function of $$H_{BQ}(z) = \frac{b_0 + b_1 z^{-1} + b_2 z^{-2}}{1 + a_1 z^{-1} + a_2 z^{-2}},$$

and the group delay equalizer has an all-pass transfer function of $$H_{BQ}(z) = \frac{c_0 + c_1 z^{-1} + c_2 z^{-2}}{1 + c_1 z^{-1} + c_2 z^{-2}}.$$

The all-pass transfer function of the group delay equalizer changes the phase response to insure a constant group delay. It follows that the transfer function of the equalizer is $$H(z) = \frac{b_0 + b_1 z^{-1} + b_2 z^{-2} + b_3 z^{-3} + b_4 z^{-4}}{1 + a_1 z^{-1} + a_2 z^{-2} + a_3 z^{-3} + a_4 z^{-4}}.$$

Figure 9:
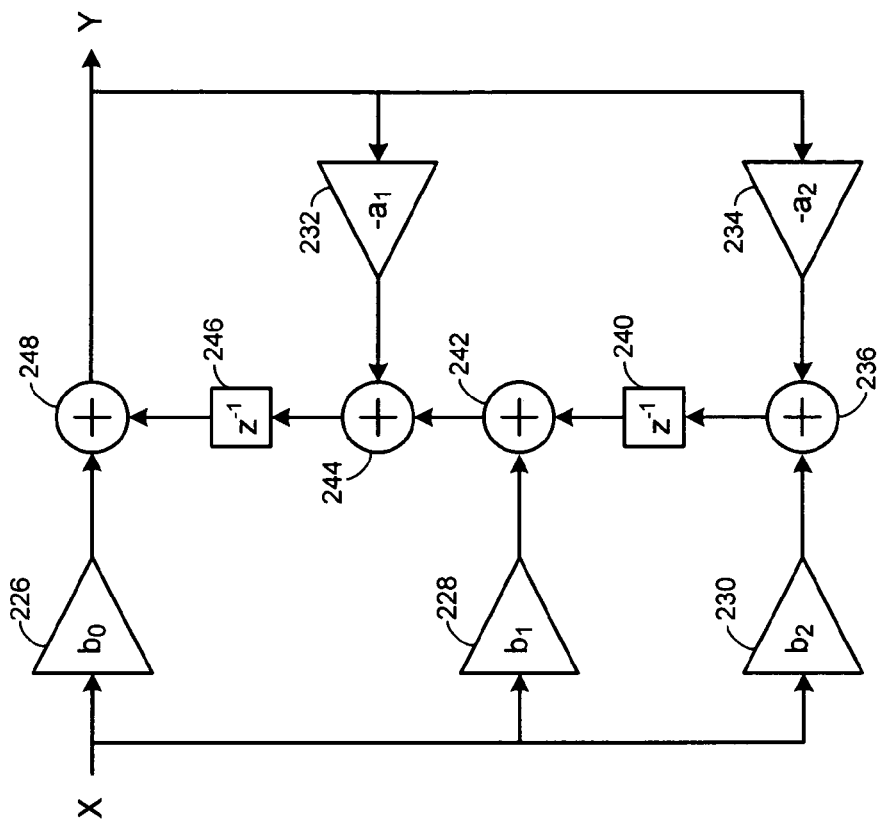
FIG. 9 is a schematic block diagram of a biquad according to an embodiment of the present invention.

FIG. 9 is a schematic block diagram of a biquad according to an embodiment of the present invention. The biquad includes a plurality of feed forward multipliers 226-230 and feedback multipliers 232 and 234 that multiply the input signal X and output signal Y, respectively, by appropriate coefficients $b_0$, $b_1$, $b_2$, $-a_1$, and $-a_2$. Summing junction 236 produces a first summed output from the outputs of multipliers 230 and 234 and couples the first summed output to delay element 240. The delayed output is summed in summing junction 242 with multiplier 228 output to produce a second summed output. Multiplier 232 multiplies the output signal Y by coefficient $-a1$. The multiplied signal is summed in summing junction 244 with the second summed output to produce a third summed output. After a delay produced by delay element 246, the third summed output is summed in summing junction 248 with the output of multiplier 226 to produce the filter output Y.

The biquad has a transfer function of the form $$H(z) = \frac{b_0 + b_1 z^{-1} + b_2 z^{-2} + b_3 z^{-3} + b_4 z^{-4}}{1 + a_1 z^{-1} + a_2 z^{-2} + a_3 z^{-3} + a_4 z^{-4}},$$

and the biquad determinant is defined as $$N_{BQ}(z) = \frac{1}{1 + a_1 z^{-1} + a_2 z^{-2}}.$$

One of average skill in the art should recognize the bit length of the output of the FIG. 9 biquad grows without bound due to the feedback and multiplication. Thus, it is desirable to limit the bit length of the biquad.

Figure 10:
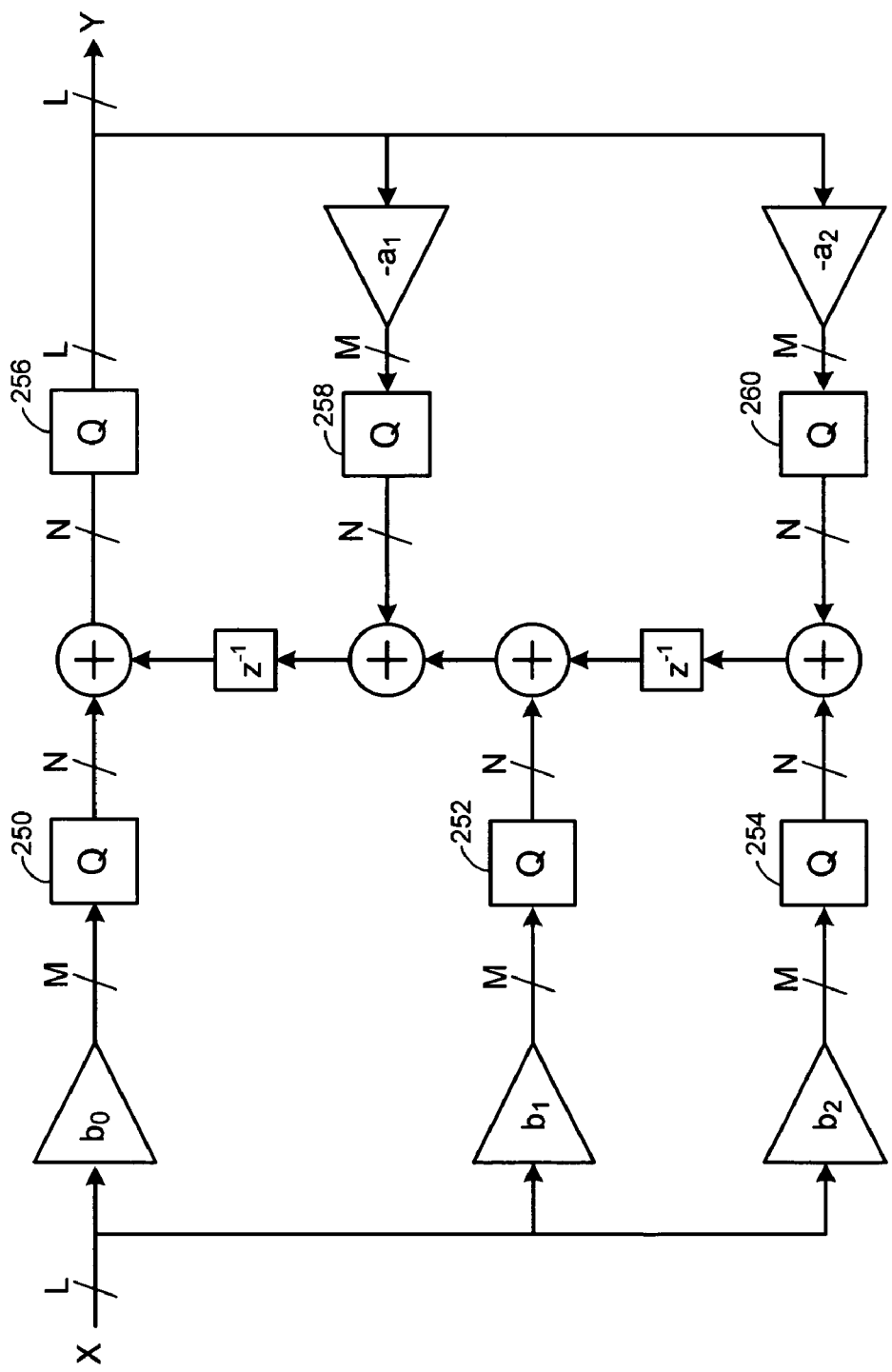
FIG. 10 is a schematic block diagram of a fixed point implementation of a biquad.

FIG. 10 is a schematic block diagram of a fixed point implementation of a biquad. In this diagram, quantizers (Q), namely quantizers 250-260, are shown in every quantization node of the biquad. The quantizers 250-260 quantize or truncate the bit length after each summation and multiplication. In the present embodiment of FIG. 10, the output of the biquad, as well as the input to the multipliers, is an L-bit word, which after coefficient multiplication is an M-bit word, where M is greater than L. If the coefficients are P-bit words, M is equal to L+P. Quantizer 256 is a coarse quantizer that quantizes the N-bit word to the L-bit word, where N is greater than L. Quantizers 250-254, 258, and 260 are fine quantizers that quantize the M-bit word to an N-bit word, where M is greater than N. As can be seen in FIG. 10, quantization produces an output Y that is the same bit length as the input X. However, the truncation of the bit length leads to quantization noise in the output Y of the biquad. The accumulation of quantization noise by phase accumulator 200 of FIG. 5 may give rise to a large and unpredictable phase error at the phase accumulator output. One aspect of the present invention is to spectrally shape the error sources within the biquad so that the energy of the quantization noise is moved from DC and low frequency to a higher frequency that does not significantly effect the accumulator output.

Figure 11:
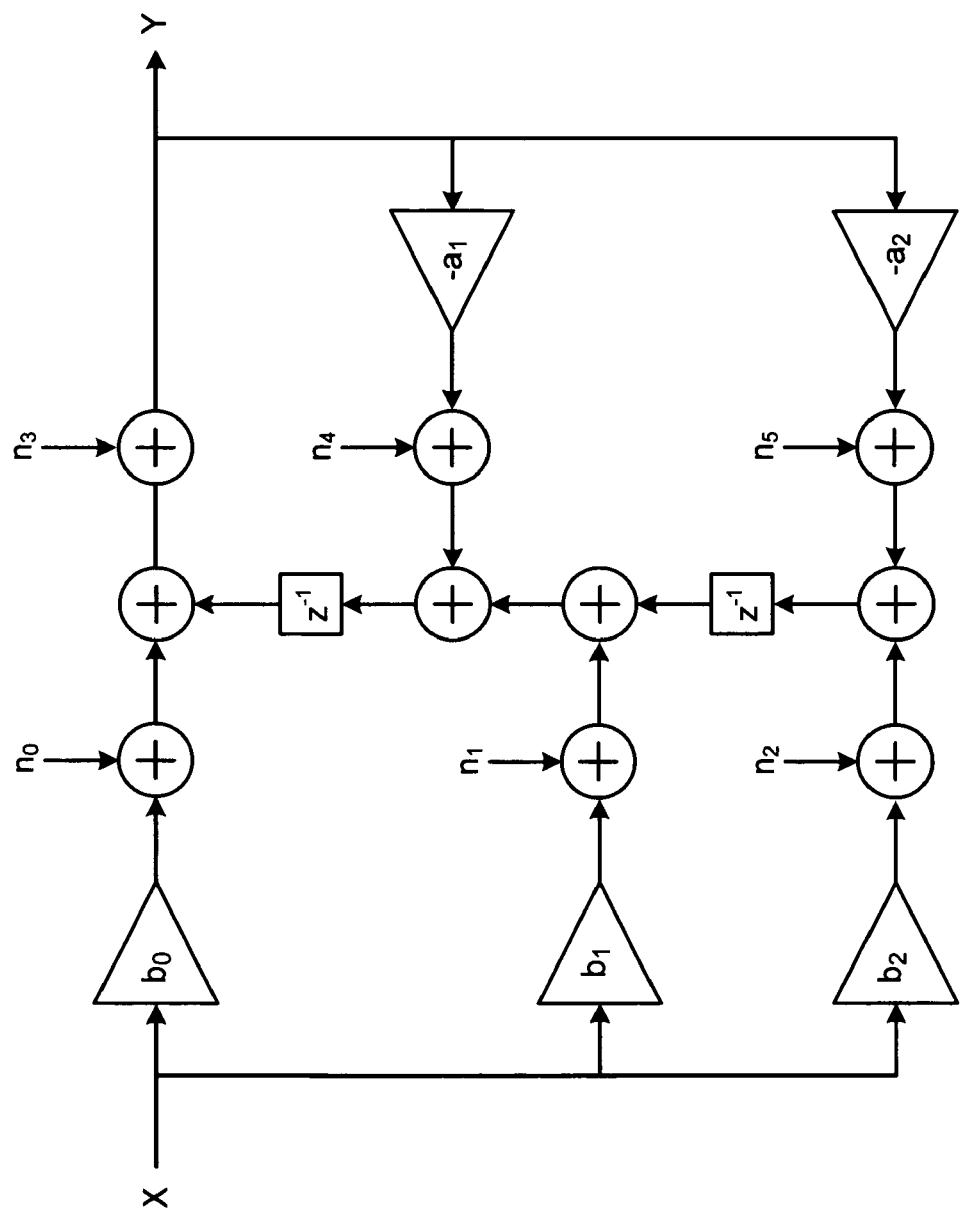
FIG. 11 is a schematic block diagram of a biquad in accordance with an embodiment of the present invention.

FIG. 11 is a schematic block diagram of a biquad in accordance with an embodiment of the present invention. FIG. 11 is a signal processing equivalent of FIG. 10, wherein additive quantization noise injected into the biquad replaces the quantization nodes of FIG. 10. Specifically, the quantization nodes may be represented as additive noise sources $$n_0, \ldots, n_5.$$

Figure 12:
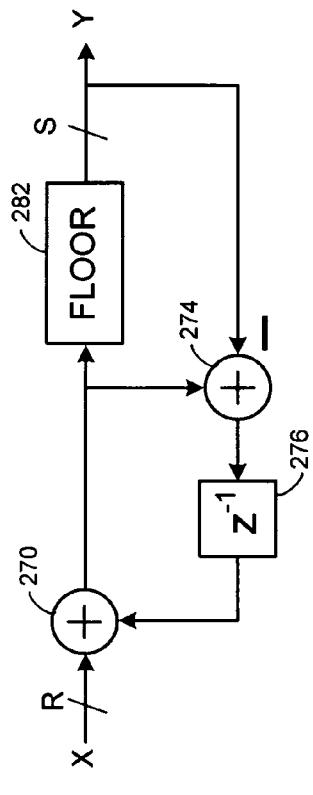
FIG. 12 is a schematic block diagram of a quantization node according to an embodiment of the present invention.

FIG. 12 is a schematic block diagram of a quantization node according to an embodiment of the present invention. The diagram of FIG. 12 replaces quantization nodes 250-260 of FIG. 10. The quantization node includes summing nodes 270 and 274, a quantizer 272, and a delay element 276. A small amount of signal processing is performed prior to quantizing the input signal. The quantization node R-bit input is quantized to an S-bit output. For the coarse quantizer 256 of FIG. 10, R=N and S=L and for the fine quantizers 250-254, 258 and 260, R=M and S=N.

As previously mentioned, the quantization function implemented by the quantization nodes is either "rounding" or "flooring", where "rounding" rounds the input to the nearest integer, i.e. for any integer x, $$\text{ROUND}\{[x-0.5; x+0.5]\}=x$$

and "flooring" rounds the input to the nearest integers towards minus infinity, i.e., $$\text{FLOOR}\{[x; x+1)\}=x$$

Thus, the output of the quantization nodes may be defined to be of either format $$\text{fxp}<A, B, \text{ROUND}>$$

or $$\text{fxp}<A, B, \text{FLOOR}>$$

where fxp denotes a signed fixed point number, A is the total number of bits in the node, and B is the number of bits, including the sign bit, used to represent the integer portion of the number. The quantizer step size is defined as $$\Delta_Q = 2^{-(A-B)}$$

Thus, for the biquad of FIG. 10, two distinct quantizer step sizes may be defined, namely $$\Delta_L,$$

denoting the step size of the L-bit coarse quantizer, and $$\Delta_N,$$

denoting the step size of the N-bit fine quantizer. In general, the quantization noise sources are correlated and posses considerable low frequency spectral content, and may thus lead to a large and widely fluctuating phase error at the output of the phase accumulator.

Figure 13:
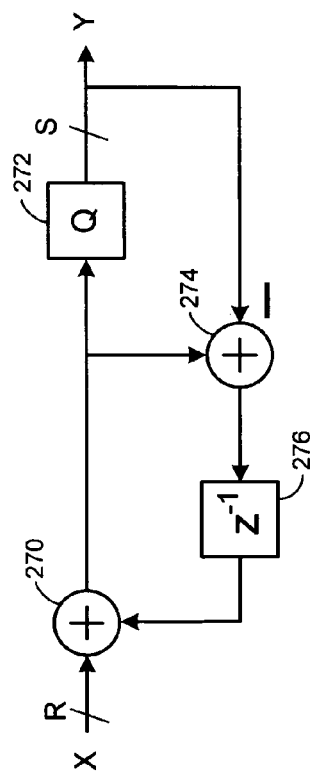
FIG. 13 is a schematic block diagram of a rounding quantization node in accordance with the present invention.

FIG. 13 is a schematic block diagram of a quantizer including a rounding quantization node 280 in accordance with the present invention.

Figure 14:
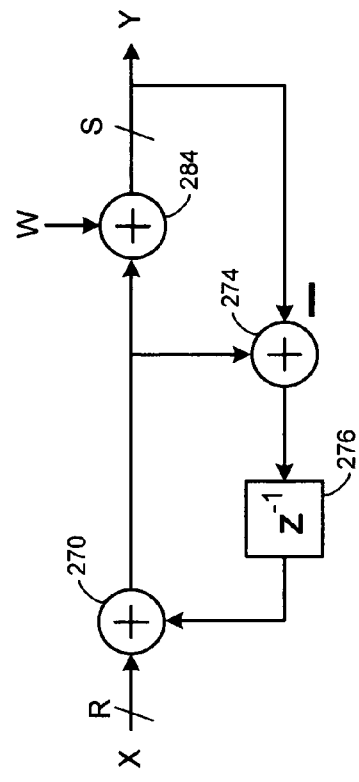
FIG. 14 is a schematic block diagram of a flooring quantization node in accordance with the present invention.

FIG. 14 is a schematic block diagram of a quantizer including a flooring quantization node 282 in accordance with the present invention.

Figure 15:
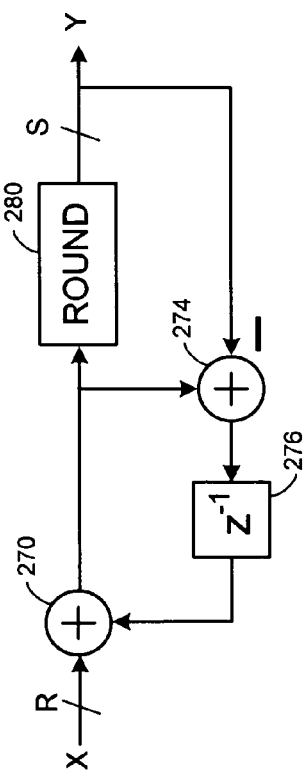
FIG. 15 is a schematic block diagram of a signal processing equivalent of the quantization node.

FIG. 15 is a schematic block diagram of a signal processing equivalent of the quantization node. The quantizer has been replaced by an noise source operably coupled to summing node 284, here labeled "w", where $$w[n]=x[n]-y[n].$$

Figure 16:
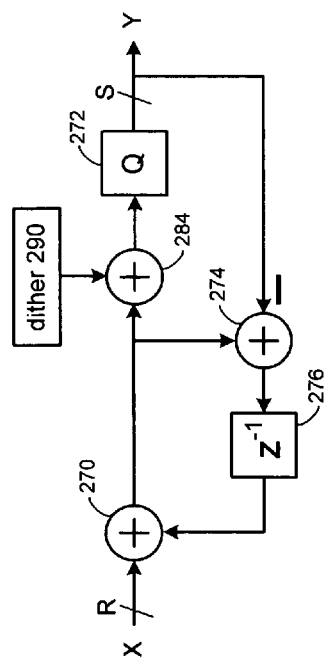
FIG. 16 is a schematic block diagram of a quantization node in accordance with the present invention.

Notice that, as long as no statements about statistical properties of the signal source "w" have been made, FIG. 15 is an exact equivalent of FIG. 12. It is always possible to define a sequence "w" such that the processing blocks of FIG. 12 and FIG. 15 produce identical outputs for the same input. FIG. 16 is a schematic block diagram of a quantization node in accordance with the present invention. The quantization node includes summing nodes 270, 274, and 284, a delay element 276, and a dither source 290. In practice, the quantization noise sources of the biquad are not uncorrelated when the quantization nodes are implemented with the circuitry of FIG. 10. This is due to the fact that multipliers b0, b1, b2 operate on the same input signal as do multipliers a1, a2. The result is a phase accumulator output phase error power of higher value, the exact amount being signal dependent and thus difficult to predict. In order to de-correlate the quantization noise sources, the quantization nodes must be enhanced by introducing uncorrelated dither into the circuitry, as shown in FIG. 16. In this figure, dither 290 represents a source of a dither signal that is uncorrelated with the quantization node input as well as uncorrelated with the dither signal of the other digital modulator quantization nodes. It can be shown that the output Y closely resembles a zero-mean random noise source and thus results in well controlled phase error power.

The quantization noise of the biquads may be modeled as uncorrelated noise sources when employing the quantization nodes of FIG. 16 with uncorrelated dither signals. Taking into account the effects of cascaded filtering, the power of the total phase accumulator output phase error is $$\sigma_e^2 = \frac{\Delta_L^2 + 5\Delta_N^2 + 12\Delta_{D,L}^2 + 60\Delta_{D,N}^2}{24\pi} \int_{-\pi}^{\pi} \sum_{i=1}^{4} \left| N_{BQ,i}(e^{j\omega}) \prod_{j=i+1}^{4} H_{BQ,j}(e^{j\omega}) \right|^2 d\omega$$

Exploiting the all pass property of the group delay equalizer, i.e., $$|H_{BQ,3}(e^{j\omega})H_{BQ,4}(e^{j\omega})|=1$$

the power of the total phase accumulator output phase error may be stated as $$\sigma_e^2 = \frac{\Delta_L^2 + 5\Delta_N^2 + 12\Delta_{D,L}^2 + 60\Delta_{D,N}^2}{24\pi} \int_{-\pi}^{\pi} \sum_{i=1}^{4} \left| N_{BQ,i}(e^{j\omega}) \prod_{j=i+1}^{2} H_{BQ,j}(e^{j\omega}) \right|^2 d\omega.$$

It follows that power of the total phase accumulator output phase error can be used to estimate the minimum quantization node output bit-widths, i.e., minimum values of L and N, required in each biquad to limit the power of the phase accumulator output phase error to a given value. Specifically, let $$\sigma_e^2 \big|_{\max}$$

denote the maximum allowable phase accumulator output phase error power. Then $$(\Delta_L^2 + 5\Delta_N^2 + 12\Delta_{D,L}^2 + 60\Delta_{D,N}^2) \big|_{\max} = \frac{24\pi \sigma_e^2 \big|_{\max}}{\int_{-\pi}^{\pi} \sum_{i=1}^{4} \left| N_{BQ,i}(e^{j\omega}) \prod_{j=i+1}^{2} H_{BQ,j}(e^{j\omega}) \right|^2 d\omega}$$

Thus, if, for example, $$\Delta_N = \frac{\Delta_L}{2^4} \text{ and}$$

$$\Delta_{D,L} = \frac{\Delta_L}{8}$$

$$\Delta_{D,N} = \frac{\Delta_N}{4} \text{ then}$$

$$\Delta_L^2 + 5\Delta_N^2 + 12\Delta_{D,L}^2 + 60\Delta_{D,N}^2 = \frac{5004}{4096}\Delta_L^2 \approx \frac{5}{4}\Delta_L^2 \text{ and}$$

$$\Delta_L \big|_{\max} = \sqrt{\frac{96\pi \sigma_e^2 \big|_{\max}}{5 \int_{-\pi}^{\pi} \sum_{i=1}^{4} \left| N_{BQ,i}(e^{j\omega}) \prod_{j=i+1}^{2} H_{BQ,j}(e^{j\omega}) \right|^2 d\omega}}.$$

Hence for the quantization node output format fxp<L, 1, ROUND> the quantizer step size is $$\Delta_L = 2^{-(L-1)},$$

and it follows that $$L \geq ceil\{\log_2(\Delta_L\big|_{\max}^{-1})\} + 1.$$

Also, based on reasonable assumptions,

N=L+4.

These calculations yield minimal bit lengths internal to the biquad for a desired maximum accumulator output phase error.

Figure 17:
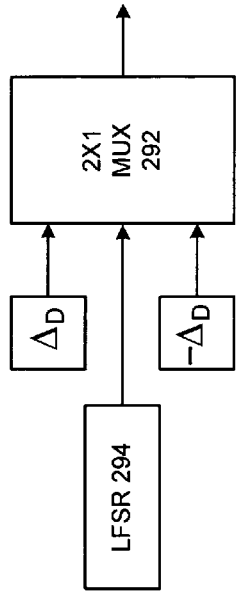
FIG. 17 is a schematic block diagram of a dither circuit according to an embodiment of the present invention.

FIG. 17 is a schematic block diagram of a dither circuit according to an embodiment of the present invention. A 2×1 MUX 292 controlled by a linear feedback shift register (LFSR) 294 produces a bipolar dither of amplitude ±ΔD, the sign of the dither signal depending upon the binary output of LFSR 294. The purpose of the dither signal is to render the quantization noise to white noise thereby spreading the low frequency spectral content into a higher frequency component.

Figure 18:
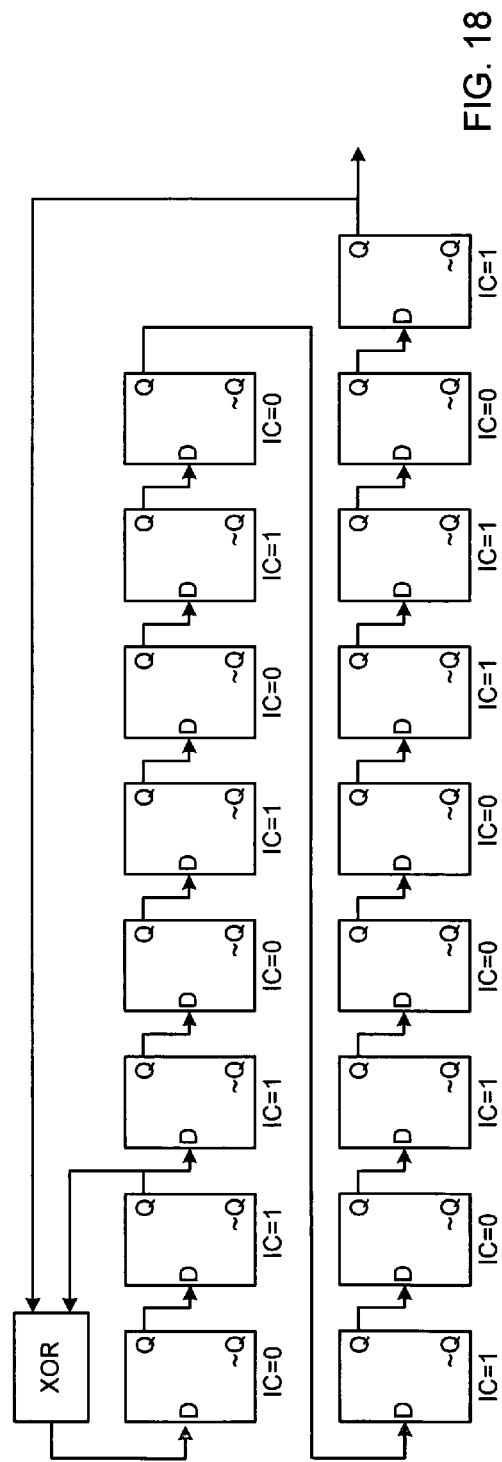
FIG. 18 is a schematic block diagram of a Linear Feedback Shift Register (LFSR) according to an embodiment of the present invention.

FIG. 18 is a schematic block diagram of the LFSR according to an embodiment of the present invention. The LFSR of FIG. 18 may be used as the dither 290 block for FIG. 16. The LSFR of FIG. 18 includes 17 flip-flops and an exclusive-or gate (XOR) and is a hardware efficient pseudo-random bit generator. As is known to one of average skill in the art, the XOR gate produces a logic one when the two inputs are at different logic levels and produces a logic zero otherwise. Each flip-flop is shown with an initial condition (IC=x) that is arbitrary as long as it is not zero for all flip-flops. The pseudo-random output of the LFSR is of length 2 m−1.

Figure 19:
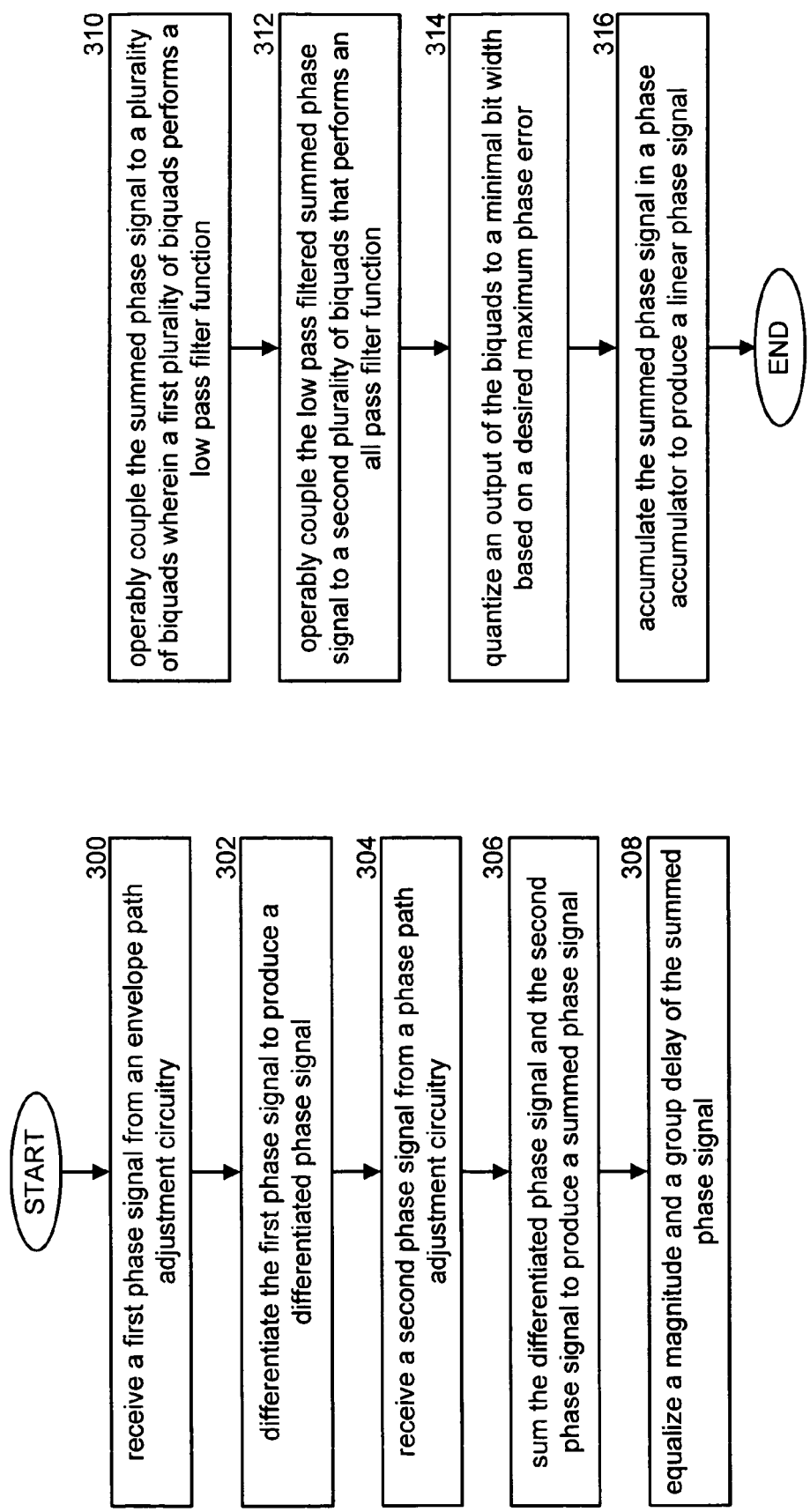
FIG. 19 is a flow chart illustrating a method for linear phase equalization in an RF polar transmitter.

FIG. 19 is a flow chart of a method for linear phase equalization in an RF polar transmitter. The method includes phase path adjustment circuitry operably coupled to receive a first phase signal from an envelope path adjustment circuitry (step 300). The first phase signal represents a PSK phase signal extracted from the in-phase and quadrature PSK signals in the phase path adjustment circuitry. A phase differentiator in the phase path adjustment circuitry differentiates the first phase signal to produce a differentiated phase signal (step 302). A summing node in the phase path adjustment circuitry receives a second phase signal from a phase path adjustment circuitry (step 304) wherein the second phase signal represents the GMSK phase signal. The summing node sums the differentiated phase signal and the second phase signal to produce a summed phase signal (step 306). The summed phase signal produces a smooth transition when switching between modulation modes. A phase magnitude and group delay equalizer equalizes a magnitude and a group delay of the summed phase signal (step 308). In order to equalize the summed phase signal, the method operably couples the summed phase signal to a plurality of biquads wherein a first plurality of biquads performs a low pass filter function (step 310) then operably couples the low pass filtered summed phase signal to a second plurality of biquads that performs an all pass filter function (step 312). The biquads of the present invention are implemented as second order IIR filters with known feed forward and feedback coefficients. In order to limit the bit width of the biquad output, quantizer nodes are added to the biquads to quantize an output of the biquads to a minimal bit width based on a desired maximum phase error of the phase accumulator output (step 314). For example, in the circuit of FIG. 10, if 16-bit coefficients are employed and L=12, then M=16+L=28, and N may be as coarse as 16. The method further includes injecting one of a flooring equalizer and a rounding equalizer to each quantization node to truncate or round, respectively, the quantizer output to the minimal bit width. Additionally, the method includes adding a dither signal to each biquad quantizer node to spectrally shift quantization noise to white noise. Thereafter, the method accumulates the summed phase signal in a phase accumulator to produce a linear phase signal (step 316).

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A multi-mode RF polar transmitter, comprises:
   digital modulator operable to produce phase-shift keying (PSK) filtered symbols and filtered Gaussian Minimum Shift Keying (GMSK) phase signals;
   envelope path adjustment circuitry coupled to received the PSK filtered symbols and operable to produce an envelope signal; and
   phase path adjustment circuitry, comprising:
      phase differentiator coupled to receive a phase signal from the envelope path adjustment circuitry and operable to differentiate phase information produced in the phase path adjustment circuitry for a PSK modulation to produce differentiated phase signals to the envelope path adjustment circuitry wherein, for a GMSK modulation, when phase accumulated in the phase path adjustment circuitry, neutralizes phase accumulation of the phase signal received from the envelope path adjustment circuitry;
      summing node operably coupled to sum the differentiated PSK phase signals and GMSK phase signals to produce summed phase signals;
      phase magnitude and group delay equalizer operably coupled to receive the summed phase signals to produce phase output signals with a phase error less than or equal to a specified value;
      phase accumulator for accumulating the phase output signals to produce accumulated phase output signal;
      direct digital frequency synthesizer (DDFS) coupled to receive the accumulated phase output signal to produce I and Q components of the accumulated phase output signal; and
      phase signal interpolator for producing an up-converted RF phase accumulated signal based upon the I and Q component accumulated phase output signal.

2. The multi-mode RF polar transmitter of claim 1 wherein the phase magnitude and group delay equalizer includes a plurality of second order infinite impulse response (IIR) filters.

3. The multi-mode RF polar transmitter of claim 2 wherein the IIR filters includes:
   a plurality of coarse quantization nodes and fine quantization nodes; and
   at least one uncorrelated dither signal that reduces IIR filter phase error.

4. The multi-mode RF polar transmitter of claim 3 wherein the plurality of coarse and fine quantization nodes are implemented as one of a rounding quantizer or a flooring quantizer that rounds or truncates an N-bit multiplicand to an L-bit result wherein L is less than N.

5. The multi-mode RF polar transmitter of claim 4 wherein the L-bit and N-bit result are derived as a minimal solution for a desired maximum phase accumulator output phase error.

6. A method for linear phase equalization in an RF polar transmitter, the method comprising:
   receiving a first phase signal from an envelope path adjustment circuitry;
   differentiating the first phase signal to produce a differentiated phase signal;
   receiving a second phase signal conducted within phase path adjustment circuitry;
   summing the differentiated phase signal and the second phase signal to produce a summed phase signal;
   equalizing a magnitude and group delay of the summed phase signal; and
   accumulating the summed phase signal in a phase accumulator to produce a linear phase signal.

7. The method of claim 6 wherein the differentiated phase signal is produced by a phase differentiator that introduces a transfer function that substantially cancels a transfer function introduced by the phase accumulator.

8. The method of claim 6 wherein the step of equalizing the magnitude and group delay comprises:
   operably coupling the summed phase signal to a plurality of biquads wherein a first plurality of biquads performs a low pass filter function;
   operably coupling the low pass filtered summed phase signal to a second plurality of biquads that performs an all pass filter function; and
   quantizing an output of the plurality of biquads to a minimal bit width based on a desired maximum phase error.

9. The method of claim 8 wherein the plurality of biquads are implemented as a second order IIR filter.

10. The method of claim 8 wherein quantizing the output of the plurality of biquads includes injecting one of a flooring equalizer and a rounding equalizer to each quantization node.

11. The method of claim 8 wherein quantizing the output of the plurality of biquads further includes adding a dither signal to each biquad quantization node to spectrally shift quantization noise to white noise.

* * * * *